(12) United States Patent
Lee et al.

(10) Patent No.: US 11,799,081 B2
(45) Date of Patent: Oct. 24, 2023

(54) POSITIVE ELECTRODE MATERIAL FOR LITHIUM SECONDARY BATTERY, POSITIVE ELECTRODE INCLUDING SAME, AND LITHIUM SECONDARY BATTERY

(71) Applicant: LG Chem, Ltd., Seoul (KR)

(72) Inventors: Dong Hun Lee, Daejeon (KR); Wang Mo Jung, Daejeon (KR); Sung Bin Park, Daejeon (KR); Ji Hye Kim, Daejeon (KR); Dong Hwi Kim, Daejeon (KR); Hyung Man Cho, Daejeon (KR); Jung Min Han, Daejeon (KR)

(73) Assignee: LG Energy Solution, Ltd.

( * ) Notice: Subject to any disclaimer, the term of this patent is extended or adjusted under 35 U.S.C. 154(b) by 249 days.

(21) Appl. No.: 16/763,341

(22) PCT Filed: Nov. 21, 2018

(86) PCT No.: PCT/KR2018/014379
§ 371 (c)(1),
(2) Date: May 12, 2020

(87) PCT Pub. No.: WO2019/103463
PCT Pub. Date: May 31, 2019

(65) Prior Publication Data
US 2020/0335783 A1    Oct. 22, 2020

(30) Foreign Application Priority Data
Nov. 21, 2017    (KR) .................. 10-2017-0155957

(51) Int. Cl.
*H01M 4/525*    (2010.01)
*H01M 4/36*    (2006.01)
(Continued)

(52) U.S. Cl.
CPC ........... *H01M 4/525* (2013.01); *H01M 4/366* (2013.01); *H01M 4/505* (2013.01); *H01M 4/66* (2013.01);
(Continued)

(58) Field of Classification Search
CPC ...... H01M 4/525; H01M 4/366; H01M 4/505; H01M 4/66; H01M 4/364; H01M 4/485;
(Continued)

(56) References Cited

U.S. PATENT DOCUMENTS

2006/0257745 A1    11/2006    Choi et al.
2009/0258296 A1    10/2009    Kawasato et al.
(Continued)

FOREIGN PATENT DOCUMENTS

CN    103296265 A    9/2013
CN    107078281 A    8/2017
(Continued)

OTHER PUBLICATIONS

Aurbach et al., "Studies of Aluminum-Doped LiNi0.5Co0.2Mn0.3O2: Electrochemical Behavior, Aging, Structural Transformations, and Thermal Characteristics," 2015, Journal of The Electrochemical Society, 162, A1014-A1027. (Year: 2015).*

(Continued)

*Primary Examiner* — Matthew W Van Oudenaren
(74) *Attorney, Agent, or Firm* — Lerner David LLP

(57) ABSTRACT

A positive electrode material including a first positive electrode active material represented by Formula 1 and a second positive electrode active material represented by Formula 2, a positive electrode including the same, and a lithium secondary battery including the positive electrode are provided. The positive electrode material has a bimodal particle size distribution including large diameter particles and small diameter particles, and the difference in average particle (Continued)

diameter ($D_{50}$) between the large diameter particles and the small diameter particles is 3 μm or greater.

13 Claims, 1 Drawing Sheet

(51) Int. Cl.
    *H01M 4/505*     (2010.01)
    *H01M 4/66*     (2006.01)
    *H01M 10/0525*     (2010.01)
    *H01M 50/46*     (2021.01)
    *H01M 4/02*     (2006.01)
    *H01M 4/131*     (2010.01)

(52) U.S. Cl.
    CPC ....... *H01M 10/0525* (2013.01); *H01M 50/46* (2021.01); *H01M 4/131* (2013.01); *H01M 4/364* (2013.01); *H01M 2004/021* (2013.01); *H01M 2004/027* (2013.01); *H01M 2004/028* (2013.01)

(58) Field of Classification Search
    CPC .. H01M 4/131; H01M 4/362; H01M 10/0525; H01M 10/052; H01M 50/46; H01M 2004/021; H01M 2004/028
    See application file for complete search history.

(56) References Cited

U.S. PATENT DOCUMENTS

| | | | |
|---|---|---|---|
| 2010/0081055 A1 | 4/2010 | Konishi et al. | |
| 2010/0099027 A1 | 4/2010 | Kikuya et al. | |
| 2013/0175469 A1* | 7/2013 | Paulsen | H01M 4/505 |
| | | | 252/182.1 |
| 2013/0302685 A1 | 11/2013 | Kim et al. | |
| 2015/0030928 A1* | 1/2015 | Kwak | H01M 4/505 |
| | | | 264/618 |
| 2015/0311512 A1* | 10/2015 | Paulsen | C01G 51/42 |
| | | | 429/219 |
| 2015/0340686 A1 | 11/2015 | Sun et al. | |
| 2016/0064730 A1* | 3/2016 | Park | C01G 49/0072 |
| | | | 429/223 |
| 2016/0254546 A1* | 9/2016 | Kwak | H01M 4/628 |
| | | | 429/223 |
| 2016/0336595 A1* | 11/2016 | Choi | H01M 10/052 |
| 2017/0309898 A1 | 10/2017 | Hong | |
| 2018/0090753 A1* | 3/2018 | Li | H01M 4/0471 |
| 2018/0241036 A1 | 8/2018 | Jo et al. | |
| 2019/0074512 A1* | 3/2019 | Choi | H01M 4/366 |
| 2020/0280069 A1* | 9/2020 | Okamoto | H01M 4/0471 |

FOREIGN PATENT DOCUMENTS

| | | |
|---|---|---|
| CN | 107949938 A | 4/2018 |
| EP | 1901374 A1 | 3/2008 |
| EP | 2405511 A2 | 1/2012 |
| EP | 3386009 A1 | 10/2018 |
| JP | 2008117611 A | 5/2008 |
| JP | 2008251532 A | 10/2008 |
| JP | 2010086693 A | 4/2010 |
| JP | 2012243463 A | 12/2012 |
| JP | 2016122626 A | 7/2016 |
| JP | 201784673 A | 5/2017 |
| KR | 20040026378 A | 3/2004 |
| KR | 20090032138 A | 3/2009 |
| KR | 20140085347 A | 7/2014 |
| KR | 20140098424 A | 8/2014 |
| KR | 20140118860 A | 10/2014 |
| KR | 101646702 B1 | 8/2016 |
| KR | 20170063373 A | 6/2017 |
| WO | 2016099229 A1 | 6/2016 |
| WO | 2017095081 A1 | 6/2017 |

OTHER PUBLICATIONS

Extended European Search Report for EP18881779.5 dated Nov. 13, 2020; 7 pages.
International Search Report for Application No. PCT/KR2018/014379, dated Feb. 22, 2019, pp. 1-2.
Search Report for Chinese Application No. 201880071631.9 dated Nov. 19, 2021. 3 pgs.

\* cited by examiner

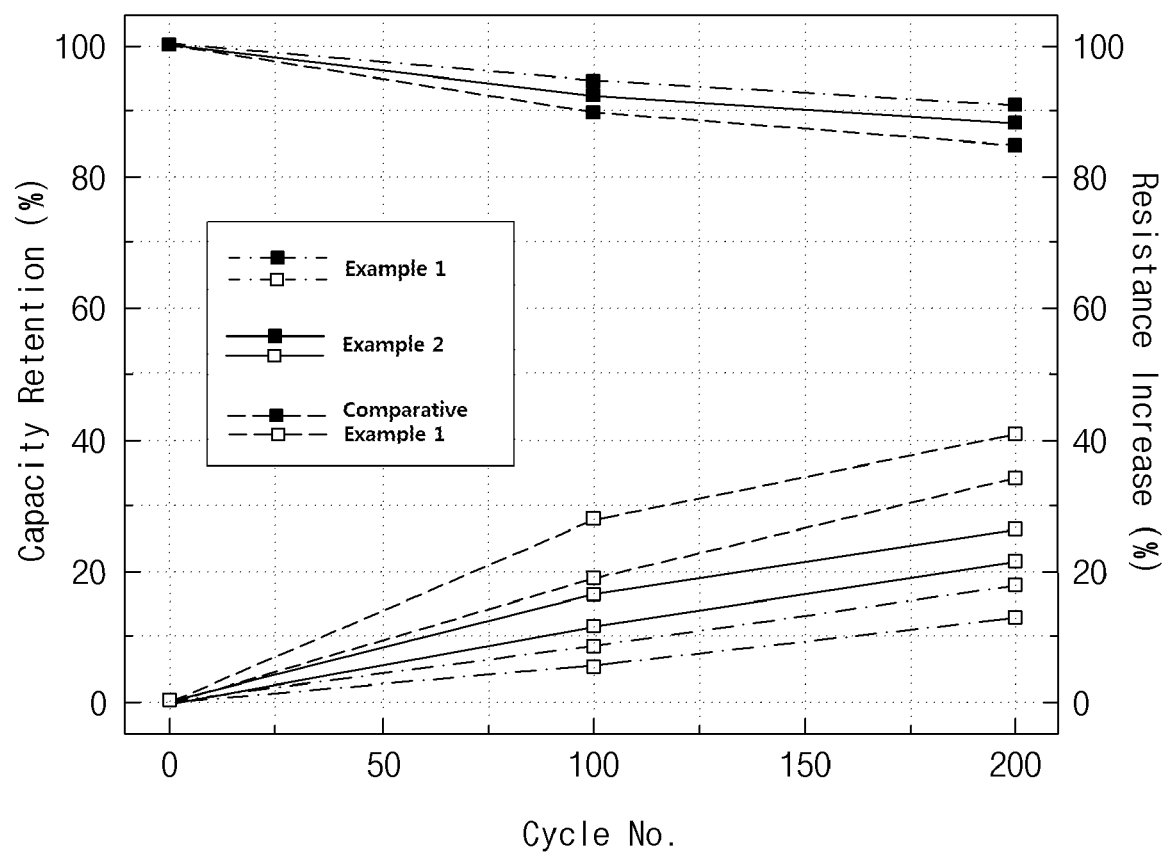

POSITIVE ELECTRODE MATERIAL FOR LITHIUM SECONDARY BATTERY, POSITIVE ELECTRODE INCLUDING SAME, AND LITHIUM SECONDARY BATTERY

CROSS-REFERENCE TO RELATED APPLICATIONS

This application is a national phase entry under U.S.C. § 371 of International Application No. PCT/KR2018/014379, filed Nov. 21, 2018, which claims priority to Korean Patent Application No. 10-2017-0155957, filed Nov. 21, 2017, the disclosures of which are incorporated herein by reference.

TECHNICAL FIELD

The present invention relates to a positive electrode material for a lithium secondary battery, a positive electrode including the same, and a lithium secondary battery.

BACKGROUND ART

As technology development and demand for mobile devices have increased, the demand for secondary batteries as an energy source has been rapidly increased. Among such secondary batteries, lithium secondary batteries having high energy density and voltage, long cycle life, and low self-discharging rate have been commercialized and widely used.

As a positive electrode active material of a lithium secondary battery, a lithium transition metal composite oxide is used. Among such lithium transition metal composite oxides, a lithium cobalt composite metal oxide which has a high functional voltage and excellent capacity properties such as $LiCoO_2$ has been mainly used. However, $LiCoO_2$ has very poor thermal properties due to the destabilization of crystal structure according to de-lithium, and is expensive. Therefore, $LiCoO_2$ has a limitation in being used as a power source for an electric vehicle or the like in a large amount.

As a material to replace $LiCoO_2$, a lithium manganese composite metal oxide ($LiMnO_2$, or $LiMn_2O_4$, and the like), a lithium iron phosphate compound ($LiFePO_4$, and the like), or a lithium nickel composite metal oxide ($LiNiO_2$, and the like) has been developed. Among these materials, research and development has been actively conducted on a lithium nickel composite metal oxide which has a high reversible capacity of about 200 mAh/g to easily implement a high capacity battery. However, when compared with $LiCoO_2$, $LiNiO_2$ has lower thermal stability. Furthermore, $LiNiO_2$ has a problem in that when an internal short circuit occurs due to external pressure or the like in a charged state, a positive electrode active material itself is decomposed, causing the rupture and ignition of a battery. Therefore, as a method for improving the thermal stability of $LiNiO_2$ while maintaining the excellent reversible capacity thereof, a lithium nickel-cobalt-manganese oxide has been developed by substituting a portion of Ni of $LiNiO_2$ with Mn and Co.

However, the lithium nickel-cobalt-manganese oxide has low roll-pressing density of particles. Particularly, when the content of Ni is increased in order to increase capacity properties, the roll-pressing density of the particles is even lowered, thereby decreasing energy density. When an electrode is roll-pressed hard in order to increase the roll-pressing density, there have been problems in that a current collector breaks and a positive electrode material cracks.

Also, in the case of a lithium nickel-cobalt-manganese oxide having a high content of Ni, the structural stability is reduced at high temperatures, so that electrochemical performance such as high-temperature lifespan is deteriorated.

Therefore, there has been a demand for developing a positive active material which is excellent in energy density and capacity properties, and also in high-temperature lifespan properties.

DISCLOSURE OF THE INVENTION

Technical Problem

An aspect of the present invention provides a high-capacity positive electrode material excellent in high-temperature lifespan properties.

Another aspect of the present invention provides a positive electrode including the positive electrode material, and a lithium secondary battery.

Technical Solution

According to an aspect of the present invention, there is provided a positive electrode material including a first positive electrode active material represented by Formula 1 and a second positive electrode active material represented by Formula 2, wherein the positive electrode material has a bimodal particle size distribution including large diameter particles and small diameter particles, and the difference in average particle diameter ($D_{50}$) between the large diameter particles and the small diameter particles is 3 μm or greater.

$Li_a[Ni_bCo_cM^1_dM^a_e]O_2$     [Formula 1]

In Formula 1, $M^1$ is Mn, Al, Zr, or Mg, and $M^a$ is one or more elements selected from the group consisting of W, Cu, Fe, V, Cr, Ti, Zr, Zn, Al, In, Ta, Y, In, La, Sr, Ga, Sc, Gd, Sm, Ca, Ce, Nb, Mg, B, and Mo, and $0.9 \leq a \leq 1.2$, $0.8 \leq b < 1$, $0.01 \leq c < 0.2$, $0.01 \leq d < 0.2$, and $0 \leq e \leq 0.02$.

$Li_x[Ni_yCo_zMn_wM^2_vM^b_u]O_2$     [Formula 2]

In Formula 2, $M^2$ is Al, Mg, Zr, or Ti, and $M^b$ is one or more elements selected from the group consisting of W, Cu, Fe, V, Cr, Ti, Zr, Zn, Al, In, Ta, Y, In, La, Sr, Ga, Sc, Gd, Sm, Ca, Ce, Nb, Mg, B, and Mo, and $0.9 \leq x \leq 1.2$, $0.8 \leq y < 1$, $0.01 \leq z < 0.2$, $0.01 \leq w < 0.2$, $0.01 \leq v < 0.2$, and $0 \leq u \leq 0.02$.

At this time, the average particle diameter ($D_{50}$) of the large diameter particles may be 10 μm to 20 μm, and the average particle diameter ($D_{50}$) of the small diameter particles may be 1 μm to 7 μm.

According to another aspect of the present invention, there is provided a positive electrode including a positive electrode current collector and a positive electrode active material layer formed on the positive electrode current collector, wherein the positive electrode active material layer includes the positive electrode material according to the present invention.

According to yet another aspect of the present invention, there is provided a lithium secondary battery including the positive electrode according to the present invention, a negative electrode, a separator interposed between the positive electrode and the negative electrode, and an electrolyte.

Advantageous Effects

A positive electrode material according to the present invention uses a lithium composite transition metal oxide having a nickel content of 80% or greater, thereby having excellent capacity properties, and has a bimodal particle size distribution, thereby having high roll-pressing density and energy density.

Also, the positive electrode material according to the present invention mixes and uses two kinds of lithium composite transition metal oxides having different compositions, thereby having excellent high-temperature lifespan properties when compared with a case in which a lithium nickel-cobalt-manganese oxide having a single composition is used.

BRIEF DESCRIPTION OF THE DRAWING

The FIGURE is a graph showing the high-temperature cycle properties of the lithium secondary battery manufactured in each of Examples 1 and 2 and Comparative Example 1.

BEST MODE FOR CARRYING OUT THE INVENTION

Hereinafter, the present invention will be described in more detail.

It will be understood that words or terms used in the specification and claims shall not be interpreted as having the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

In the present specification, an average particle diameter ($D_{50}$) may be defined as a particle diameter at 50% of a particle diameter distribution, and may be measured by using a laser diffraction method. Specifically, target particles are dispersed in a dispersion medium, and then introduced into a commercially available laser diffraction particle size measurement device (for example, Microtrac MT 3000) to be irradiated with ultrasonic waves of about 28 kHz to an output of 60 W. Thereafter, the average particle diameter ($D_{50}$) may be measured at 50% in a particle number distribution according to particle diameters in the measurement device.

Also, in the present specification, % means wt % unless otherwise indicated.

The present inventors have repeatedly conducted research on developing a positive electrode material excellent in capacity properties, energy density, and high-temperature lifespan properties. As a result, the present inventors have found that the above-described objectives may be achieved by using a positive electrode material which includes two kinds of positive electrode active materials having a specific composition and which has a bimodal particle size distribution including large diameter particles and small diameter particles with an average particle diameter difference of 3 μm or greater, and have completed the present invention.

Positive Electrode Material

First, a positive electrode material according to the present invention will be described.

The positive electrode material according to the present invention includes a first positive electrode active material and a second positive electrode active material having different compositions, and has a bimodal particle size distribution including large diameter particles and small diameter particles. At this time, the difference in average particle diameter ($D_{50}$) between the large diameter particles and the small diameter particles may be 3 μm or greater, preferably 3 μm to 15 μm, more preferably 3 μm to 10 μm.

The first positive electrode active material is a lithium composite transition metal oxide having a nickel content of 80 mol % or greater, specifically, a lithium composite transition metal oxide represented by [Formula 1] below.

$$Li_a[Ni_bCo_cM^1_dM^a_e]O_2 \quad \text{[Formula 1]}$$

In Formula 1, the $M^1$ is Mn, Al, Zr, or Mg, and $M^a$ is a doping element substituted on a transition metal (Ni, Co and/or $M^1$) site, and may be one or more elements selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo.

The a represents a molar ratio of lithium, and may satisfy the relation of 0.9≤a≤1.2, preferably 1.1≤a≤1.2.

The b represents a molar ratio of nickel in the total transition metals, and may satisfy the relation of 0.8≤b<1, preferably 0.8≤b≤0.98.

The c represents a molar ratio of cobalt in the total transition metals, and may satisfy the relation of 0.01≤c<0.2, preferably 0.01≤c≤0.15.

The d represents a molar ratio of $M^1$ in the total transition metals, and may satisfy the relation of 0.01≤d<0.2, preferably 0.01≤d≤0.15.

The e represents a molar ratio of the doping element $M^a$ in the total transition metals, and may satisfy the relation of 0≤e≤0.02, preferably 0≤e≤0.01.

Specifically, the first positive electrode active material may be $Li_a[Ni_bCo_cMn_d]O_2$, $Li_a[Ni_bCo_cAl_d]O_2$, $Li_a[Ni_bCo_cZr_d]O_2$, $Li_a[Ni_bCo_cMg_d]O_2$, $Li_a[Ni_bCo_cMn_dAl_e]O_2$, $Li_a[Ni_bCo_cMn_dZr_e]O_2$, $Li_a[Ni_bCo_cMn_dMg_e]O_2$, $Li_a[Ni_bCo_cAl_dZr_e]O_2$, or $Li_a[Ni_bCo_cAl_dMg_e]O_2$ (wherein, a, b, c, d, and e are the same as defined in Formula 1), and the like, but is not limited thereto.

The second positive electrode active materials is a lithium composite transition metal oxide having a nickel content of 80 mol % or greater, specifically, a lithium composite transition metal oxide represented by [Formula 2] below.

$$Li_x[Ni_yCo_zMn_wM^2_vM^b_u]O_2 \quad \text{[Formula 2]}$$

In Formula 2, the $M^2$ is Al, Mg, Zr, or Ti, and $M^b$ is a doping element substituted on a transition metal (Ni, Co and/or $M^2$) site, and may be one or more elements selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo.

The x represents a molar ratio of lithium, and may satisfy the relation of 0.9≤x≤1.2, preferably 1.1≤x≤1.2.

The y represents a molar ratio of nickel, and may satisfy the relation of 0.8≤y<1, preferably 0.8≤y≤0.98.

The z represents a molar ratio of cobalt, and may satisfy the relation of 0.01≤z<0.2, preferably 0.01≤z≤0.15.

The w represents a molar ratio of manganese, and may satisfy the relation of 0.01≤w<0.2, preferably 0.01≤w≤0.1.

The v represents a molar ratio of $M^2$, and may satisfy the relation of 0.01≤v<0.2, preferably 0.01≤v≤0.1.

The u represents a molar ratio of the doping element $M^b$ in the total transition metals, and may satisfy the relation of 0≤u≤0.02, preferably 0≤u≤0.01.

Specifically, the second positive electrode active material may be $Li_x[Ni_yCo_zMn_wAl_v]O_2$, $Li_x[Ni_yCo_zMn_wMg_v]O_2$, $Li_x[Ni_yCo_zMn_wZr_v]O_2$, $Li_x[Ni_yCo_zMn_wTi_v]O_2$, $Li_x[Ni_yCo_zMn_wAl_vMg_u]O_2$, $Li_x[Ni_yCo_zMn_wAl_vZr_u]O_2$, or $Li_x[Ni_yCo_zMn_wAl_vTi_u]O_2$ (wherein, x, y, z, w, v and u are the same as defined in Formula 2), and the like, but is not limited thereto.

Meanwhile, if necessary, the first positive electrode active material and/or the second positive electrode active material may further include a coating layer on the surface thereof. At this time, the coating layer may include at least one coating element selected from the group consisting of one or more elements selected from the group consisting of Al, Ti, W, B, F, P, Mg, Ni, Co, Fe, Cr, V, Cu, Ca, Zn, Zr, Nb, Mo, Sr, Sb, Bi, Si, and S. When the coating layer is formed as described above, the contact between the positive electrode active material and an electrolyte is prevented, thereby suppressing the occurrence of a side reaction. Therefore, when the coating layer is applied to a battery, lifespan properties of the battery may be improved, and furthermore, the filling density of the positive electrode active material may be increased.

As described above, when a coating element is additionally included, the content of the coating element in the coating layer may be 100 ppm to 10,000 ppm, preferably 200 ppm to 5,000 ppm based on the total weight of the positive electrode active material.

The coating layer may be formed on the entire surface, or on a portion of the surface of the positive electrode active material. Specifically, when the coating layer is formed on a portion of the surface of the positive electrode active material, the coating layer may be formed in an area of 5% to less than 100%, preferably 20% to less than 100% of the total surface area of the positive electrode active material.

Meanwhile, the first positive electrode active material and the second positive electrode active material may be such that the content of transition metal elements in an active material particle may be constant regardless of the position thereof, or the content of one or more metal elements may vary depending on the position thereof inside the particle. For example, the positive electrode active material may have a concentration gradient in which the concentration of at least one of Ni, Mn, Co, $M^1$, or $M^2$ gradually changes. The 'gradually changing concentration gradient' may mean that the concentration of each of the components is present in a concentration distribution that changes continuously in a stepwise manner in the entire region or a specific region of the particle.

Since both the first positive electrode active material and the second positive electrode active material include nickel of 80 mol % or more, excellent capacity properties may be implemented. Also, according to the research by the present inventors, when a positive electrode active material of [Formula 1] and a positive electrode active material of [Formula 2] are mixed and used as described above, there is an effect of improving lifespan properties at high temperatures.

Meanwhile, the positive electrode material of the present invention may include the first positive electrode active material and the second positive electrode active material at a weight ratio of 10:90 to 90:10, preferably 20:80 to 80:20, more preferably 30:70 to 70:30. When the mixing ratio of the first positive electrode active material and the second positive electrode active material satisfies the above range, high electrode density may be obtained.

Meanwhile, the positive electrode material of the present invention has a bimodal particle size distribution including large diameter particles and small diameter particles having different average particle diameters ($D_{50}$). When the positive electrode material has a bimodal particle size distribution as described above, empty spaces between the large diameter particles are filled with the small diameter particles during roll-pressing, so that high roll-pressing density and energy density may be implemented.

At this time, the difference in average particle diameter ($D_{50}$) between the large diameter particles and the small diameter particles may be 3 μm or greater, preferably 3 μm to 15 μm, more preferably 3 μm to 10 μm. When the difference in average particle diameter ($D_{50}$) between large diameter particles and small diameter particles satisfies the above range, the small diameter particles are well filled between the large diameter particles, so that there is an excellent effect of improving roll-pressing density and energy density.

Specifically, the average particle diameter ($D_{50}$) of the large diameter particles may be 10 μm to 20 μm, preferably 11 μm to 18 μm, more preferably 12 μm to 18 μm. Also, the average particle diameter ($D_{50}$) of the small diameter particles may be 1 μm to 7 μm, preferably 2 μm to 7 μm, more preferably 3 μm to 6 μm.

Meanwhile, the type of an active material constituting the small diameter particles and the large diameter particles is not particularly limited, and the active material may be the first positive electrode active material and/or the second positive electrode active material.

According to one embodiment, the positive electrode material of the present invention may be such that the first positive electrode active material constitutes large diameter particles and the second positive electrode active material constitutes small diameter particles.

According to another embodiment, the positive electrode material of the present invention may be such that the first positive electrode active material constitutes small diameter particles and the second positive electrode active material constitutes large diameter particles.

According to yet another embodiment, the positive electrode material of the present invention may be such that at least one of the first positive electrode active material or the second positive electrode active material has a bimodal particle diameter distribution including both the large diameter particles and the small diameter particles.

Positive Electrode

Next, a positive electrode according to the present invention will be described.

The positive electrode according to the present invention includes a positive electrode current collector and a positive electrode active material layer formed on the positive electrode current collector. At this time, the positive electrode active material layer includes the positive electrode material according to the present invention, and if necessary, includes a conductive material and/or a binder.

At this time, the positive electrode material is the same as described above, may be included in an amount of 80-99 wt %, more specifically 85-98.5 wt % based on the total weight of the positive electrode active material layer. When a positive electrode material is included in the above range, excellent capacity properties may be exhibited.

The positive electrode current collector is not particularly limited as long as it has conductivity without causing a chemical change in a battery. For example, stainless steel, aluminum, nickel, titanium, fired carbon, or aluminum or stainless steel that is surface-treated with one of carbon, nickel, titanium, silver, and the like may be used. Also, the positive electrode current collector may typically have a thickness of 3 μm to 500 μm, and microscopic irregularities may be formed on the surface of the positive electrode current collector to improve the adhesion of a positive electrode material. For example, the positive electrode current collector may be used in various forms such as a film, a sheet, a foil, a net, a porous body, a foam, and a non-woven body.

The conductive material is used to impart conductivity to an electrode, and any conductive agent may be used without particular limitation as long as it has electron conductivity without causing a chemical change in a battery to be constituted. Specific examples thereof may include graphite such as natural graphite or artificial graphite; a carbon-based material such as carbon black, acetylene black, Ketjen black, channel black, furnace black, lamp black, thermal black, and carbon fiber; metal powder or metal fiber of such as copper, nickel, aluminum, and silver; a conductive whisker such as a zinc oxide whisker and a potassium titanate whisker; a conductive metal oxide such as titanium oxide; or a conductive polymer such as a polyphenylene derivative, and any one thereof or a mixture of two or more thereof may be used. The conductive material may be included in an amount of 0.1-15 wt % based on the total weight of the positive electrode active material layer.

The binder serves to improve the bonding between positive electrode active material particles and the adhesion between the positive electrode active material and the current collector. Specific examples of the binder may include polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber (SBR), fluorine rubber, or various copolymers thereof, and any one thereof or a mixture of two or more thereof may be used. The binder may be included in an amount of 0.1-15 wt % based on the total weight of the positive electrode active material layer.

The positive electrode of the present invention may be manufactured according to a typical method for manufacturing a positive electrode except that the positive electrode material according to the present invention is used as a positive electrode active material. Specifically, the positive electrode may be manufactured by applying a positive electrode mixed material, which is prepared by dissolving or dispersing a positive electrode material, a binder and/or a conductive material in a solvent, on a positive electrode current collector, followed by drying and roll-pressing.

The solvent may be a solvent commonly used in the art. Examples of the solvent may include dimethyl sulfoxide (DMSO), isopropyl alcohol, N-methylpyrrolidone (NMP), acetone, or water, and any one thereof or a mixture of two or more thereof may be used. The amount of the solvent to be used is not particularly limited as long as it may be adjusted such that a positive electrode mixture material has appropriate viscosity in consideration of the applying thickness, preparation yield, workability, and the like of the positive electrode material.

Alternatively, in another method, the positive electrode may be manufactured by casting the positive electrode mixture material on a separate support and then laminating a film peeled off from the support on a positive electrode current collector.

Lithium Secondary Battery

Next, a lithium secondary battery according to the present invention will be described.

The lithium secondary battery of the present invention includes a positive electrode, a negative electrode, a separator interposed between the positive electrode and the negative electrode, and an electrolyte. At this time, the positive electrode is the same as the positive electrode according to the present invention described above. Therefore, hereinafter, a detailed description of the positive electrode will be omitted, and only the rest of the compositions will be described.

The negative electrode includes a negative electrode current collector and a negative electrode active material layer positioned on the negative electrode current collector.

The negative electrode current collector is not particularly limited as long as it has high conductivity without causing a chemical change in a battery. For example, copper, stainless steel, aluminum, nickel, titanium, fired carbon, copper or stainless steel that is surface-treated with one of carbon, nickel, titanium, silver, and the like, an aluminum-cadmium alloy, and the like may be used. Also, the negative electrode current collector may typically have a thickness of 3 μm to 500 μm, and as in the case of the positive electrode current collector, microscopic irregularities may be formed on the surface of the negative electrode current collector to improve the adhesion of a negative electrode active material. For example, the negative electrode current collector may be used in various forms such as a film, a sheet, a foil, a net, a porous body, a foam, and a non-woven body.

The negative electrode active material layer selectively includes a binder and a conductive material in addition to a negative electrode active material.

Various negative electrode active materials used in the art may be used as the negative electrode active material without particular limitation. Specific examples of the negative electrode active material may include a carbonaceous material such as artificial graphite, natural graphite, graphitized carbon fiber, and amorphous carbon; a metallic compound alloyable with lithium such as Si, Al, Sn, Pb, Zn, Bi, In, Mg, Ga, Cd, a Si alloy, a Sn alloy, or an Al alloy; a metal oxide which may be doped and undoped with lithium such as $SiO_\beta$ ($0<\beta<2$), $SnO_2$, a vanadium oxide, and a lithium vanadium oxide; or a composite including the metallic compound and the carbonaceous material such as an Si—C composite or an Sn—C composite, and any one thereof or a mixture of two or more thereof may be used. Also, a metal lithium thin film may be used as the negative electrode active material. Furthermore, both low crystalline carbon and high crystalline carbon may be used as a carbon material. Typical examples of low crystalline carbon may include soft carbon and hard carbon, and typical examples of high crystalline carbon may include irregular, planar, flaky, spherical, or fibrous natural graphite or artificial graphite, Kish graphite, pyrolytic carbon, mesophase pitch-based carbon fiber, meso-carbon microbeads, mesophase pitches, and high-temperature sintered carbon such as petroleum or coal tar pitch derived cokes.

Meanwhile, the negative electrode active material may be included in an amount of 80 wt % to 99 wt % based on the total weight of the negative electrode active material layer.

The binder is a component for assisting in bonding between a conductive material, an active material, and a current collector, and is typically added in an amount of 0.1 wt % to 10 wt % based on the total weight of a negative electrode active material layer. Examples of the binder may include polyvinylidene fluoride (PVDF), polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber, nitrile-butadiene rubber, fluorine rubber, various copolymers thereof, and the like.

The conductive material is a component for further improving the conductivity of a negative electrode active material, and may be added in an amount of 10 wt % or less, preferably 5 wt % or less based on the total weight of a negative electrode active material layer. The conductive material is not particularly limited as long as it has conductivity without causing a chemical change in the battery. For example, graphite such as natural graphite or artificial graphite; carbon black such as acetylene black, Ketjen black, channel black, furnace black, lamp black, and thermal black; conductive fiber such as carbon fiber and metal fiber; metal powder such as fluorocarbon powder, aluminum powder, and nickel powder; a conductive whisker such as zinc oxide and potassium titanate; a conductive metal oxide such as titanium oxide; or a conductive material such as a polyphenylene derivative, and the like may be used.

The negative electrode active material layer may be prepared by applying a negative electrode mixture material, which is prepared by dissolving or dispersing a negative electrode active material and selectively a binder and a conductive material in a solvent, on a negative electrode current collector, following by drying. Alternatively, the negative electrode active material layer may be prepared by casting the negative electrode mixture material on a separate support, and then laminating a film peeled off from the support on a negative electrode current collector.

Meanwhile, in the lithium secondary battery, the separator is to separate the negative electrode and the positive electrode and to provide a movement path for lithium ions. Any separator may be used without particular limitation as long as it is typically used as a separator in a lithium secondary battery. Particularly, a separator having high moisture-retention ability for an electrolyte as well as low resistance to the movement of electrolyte ions is preferable. Specifically, as the separator, a porous polymer film, for example, a porous polymer film prepared from a polyolefin-based polymer such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of glass fiber having a high melting point, or polyethylene terephthalate fiber, and the like may be used. Also, a coated separator including a ceramic component or a polymer material may be used to secure heat resistance or mechanical strength, and may be selectively used in a single-layered or a multi-layered structure.

Also, as an electrolyte used in the present invention, an organic liquid electrolyte, an inorganic liquid electrolyte, a solid polymer electrolyte, a gel-type polymer electrolyte, a solid inorganic electrolyte, a molten-type inorganic electrolyte, and the like which may be used in a lithium secondary battery may be used. However, the embodiment of the inventive concept is not limited there.

Specifically, the electrolyte may include an organic solvent and a lithium salt.

Any organic solvent may be used without particular limitation as long as it may serve as a medium through which ions involved in an electrochemical reaction of a battery may move. Specifically, as the organic solvent, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (wherein R is a linear, branched, or cyclic hydrocarbon group having 2 to 20 carbon atoms, and may include a double-bond aromatic ring or ether bond); amides such as dimethylformamide; dioxolanes such as 1,3-dioxolane; or sulfolanes may be used. Among these solvents, a carbonate-based solvent is preferable, and a mixture of a cyclic carbonate (e.g., ethylene carbonate or propylene carbonate) having high ionic conductivity and high dielectric constant and a linear carbonate-based compound having low viscosity (e.g., ethylmethyl carbonate, dimethyl carbonate, or diethyl carbonate), the mixture which may increase charging/discharging performance of a battery, is more preferable. In this case, when the cyclic carbonate and the chain carbonate are mixed in a volume ratio of about 1:1 to about 1:9, the performance of the electrolyte may be excellent.

Any lithium salt may be used without particular limitation as long as it is typically used in an electrolyte for a lithium secondary battery. For example, $Li^+$ may be included as a positive ion of the lithium salt, and a negative ion thereof may be at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$. Specifically, the lithium salt may include a single material or a mixture of two or more selected from the group consisting of LiCl, LiBr, LiI, $LiClO_4$, $LiBF_4$, $LiB_{10}Cl_{10}$, $LiPF_6$, $LiCF_3SO_3$, $LiCH_3CO_2$, $LiCF_3CO_2$, $LiAsF_6$, $LiSbF_6$, $LiAlCl_4$, $LiAlO_4$, and $LiCH_3SO_3$, and in addition to these, any electrolyte salt commonly used in an electrolyte for a lithium secondary battery may be used without limitation, such as an imide salt represented by LiBETI (lithium bisperfluoroethanesulfonimide, $LiN(SO_2C_2F_5)_2$), LiFSI (lithium bis(fluorosulfonyl)imide, $LiN(SO_2F)_2$), and LiTFSI (lithium bis(trifluoromethanesulfon)imide, $LiN(SO_2CF_3)_2$). Specifically, the electrolyte salt may include a single material or a mixture of two or more selected from the group consisting of $LiPF_6$, $LiBF_4$, $LiCH_3CO_2$, $LiCF_3CO_2$, $LiCH_3SO_3$, LiFSI, LiTFSI, and $LiN(C_2F_5SO_2)_2$.

The content of the lithium salt may be appropriately changed within a range typically available. Specifically, the lithium salt may be included in an electrolyte in a range of 0.8 M to 3 M, specifically 0.1 M to 2.5 M.

In the electrolyte, in order to improve the lifespan properties of a battery, suppress the reduction in battery capacity, and improve the discharge capacity of the battery, and the like, various additives may be used in addition to the above electrolyte components. As the additives, for example, a halo-alkylene carbonate-based compound such as difluoroethylene carbonate; or pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride may be included, and the above additives may be used alone or in combination. At this time, the additive may be included in an amount of 0.1 wt % to 5 wt % based on the total weight of an electrolyte.

The lithium secondary battery according to the present invention such as described above may be usefully used in portable devices such as a mobile phone, a notebook computer, and a digital camera, and in electric cars such as a hybrid electric vehicle (HEV).

Accordingly, according to another embodiment of the present invention, a battery module including the lithium secondary battery as a unit cell, and a battery pack including the same are provided.

The battery module or the battery pack may be used as a power source of at least one medium-and-large sized device such as a power tool; electric cars including an electric vehicle (EV), a hybrid electric vehicle (HEV), and a plug-in hybrid electric vehicle (PHEV); or a power storage system.

The external shape of the lithium secondary battery of the present invention is not particularly limited, but may be a cylindrical shape using a can, a square shape, a pouch shape, a coin shape, or the like.

The lithium secondary battery according to the present invention may be used in a battery cell which is used as a power source for a small-sized device, and may also be preferably used as a unit cell for a medium- and large-sized battery module including a plurality of battery cells.

MODE FOR CARRYING OUT THE INVENTION

Hereinafter, the present invention will be described in more detail with reference to embodiments. However, the embodiments according to the present invention may be modified into other various forms, and the scope of the present invention should not be construed as being limited to the embodiments described below. The embodiments of the present invention are provided to more fully describe the present invention to those skilled in the art.

Example 1

$LiNi_{0.8}Co_{0.1}Mn_{0.1}O_2$ having an average particle diameter ($D_{50}$) of 5 μm and $LiNi_{0.83}Co_{0.11}Mn_{0.04}Al_{0.02}O_2$ having an average particle diameter ($D_{50}$) of 15 μm were mixed at a weight ratio of 30:70 to prepare positive electrode material A.

Positive electrode material A prepared as described above, a carbon black conductive material, and a PVdF binder were mixed at a weight ratio of 96:2:2, and then the mixture was mixed in an NMP solvent to prepare a positive electrode mixture material. The positive electrode mixture material was applied on aluminum foil having a thickness of 12 μm, dried, and then roll-pressed to manufacture a positive electrode.

Meanwhile, a graphite negative electrode active material, a carbon conductive material (SuperC65), a PVdF binder were mixed at a weight ratio of 95.6:0.75:3.65, and then the mixture was added to an NMP solvent to prepare a negative electrode mixture material. The negative electrode mixture material was applied on copper foil having a thickness of 20 μm, dried, and then roll-pressed to manufacture a negative electrode.

The positive electrode and the negative electrode manufactured as described above were laminated together with a polyethylene separator to prepare an electrode assembly, and then the electrode assembly was placed inside a battery case. Thereafter, an electrolyte prepared by dissolving $LiPF_6$ of 1 M, 0.5 parts by weight of vinylene carbonate (VC), and 1.0 part by weight of 1,3-propane sultone (PS) based on 100 parts by weight of a mixed solvent of ethylene carbonate:propyl propionate:diethyl carbonate mixed at a ratio of 3:1:6 was injected into the battery case to manufacture a lithium secondary battery.

Example 2

$LiNi_{0.8}Co_{0.1}Mn_{0.1}O_2$ having an average particle diameter ($D_{50}$) of 15 μm and $LiNi_{0.83}Co_{0.11}Mn_{0.04}Al_{0.02}O_2$ having an average particle diameter ($D_{50}$) of 5 μm were mixed at a weight ratio of 70:30 to prepare Positive electrode material B.

A lithium secondary battery was manufactured in the same manner as in Example 1 except that Positive electrode material B prepared as described above was used instead of Positive electrode material A.

Example 3

$LiNi_{0.8}Co_{0.1}Mn_{0.1}O_2$ having an average particle diameter ($D_{50}$) of 10 μm and $LiNi_{0.83}Co_{0.11}Mn_{0.04}Al_{0.02}O_2$ having an average particle diameter ($D_{50}$) of 5 μm were mixed at a weight ratio of 70:30 to prepare Positive electrode material C.

A lithium secondary battery was manufactured in the same manner as in Example 1 except that Positive electrode material C prepared as described above was used instead of Positive electrode material A.

Example 4

$LiNi_{0.8}Co_{0.1}Mn_{0.1}O_2$ having an average particle diameter ($D_{50}$) of 13 μm and $LiNi_{0.83}Co_{0.11}Mn_{0.04}Al_{0.02}O_2$ having an average particle diameter ($D_{50}$) of 5 μm were mixed at a weight ratio of 70:30 to prepare Positive electrode material D.

A lithium secondary battery was manufactured in the same manner as in Example 1 except that Positive electrode material D prepared as described above was used instead of Positive electrode material A.

Example 5

$LiNi_{0.85}Co_{0.1}Mn_{0.05}O_2$ having an average particle diameter ($D_{50}$) of 15 μm and $LiNi_{0.83}Co_{0.11}Mn_{0.05}Mg_{0.01}O_2$ having an average particle diameter ($D_{50}$) of 5 μm were mixed at a weight ratio of 70:30 to prepare Positive electrode material E.

A lithium secondary battery was manufactured in the same manner as in Example 1 except that Positive electrode material E prepared as described above was used instead of Positive electrode material A.

Comparative Example 1

$LiNi_{0.8}Co_{0.1}Mn_{0.1}O_2$ having an average particle diameter ($D_{50}$) of 15 μm and $LiNi_{0.8}Co_{0.1}Mn_{0.1}O_2$ having an average particle diameter ($D_{50}$) of 5 μm were mixed at a weight ratio of 70:30 to prepare Positive electrode material F.

A lithium secondary battery was manufactured in the same manner as in Example 1 except that Positive electrode material F prepared as described above was used instead of Positive electrode material A.

Comparative Example 2

$LiNi_{0.8}Co_{0.1}Mn_{0.1}O_2$ having an average particle diameter ($D_{50}$) of 6 μm and $LiNi_{0.83}Co_{0.11}Mn_{0.04}Al_{0.02}O_2$ having an average particle diameter ($D_{50}$) of 8 μm were mixed at a weight ratio of 70:30 to prepare Positive electrode material G.

A lithium secondary battery was manufactured in the same manner as in Example 1 except that Positive electrode material G prepared as described above was used instead of Positive electrode material A.

Comparative Example 3

LiNi$_{0.8}$Co$_{0.1}$Mn$_{0.1}$O$_2$ having an average particle diameter (D$_{50}$) of 15 µm and LiNi$_{0.83}$Co$_{0.11}$Mn$_{0.04}$Al$_{0.02}$O$_2$ having an average particle diameter (D$_{50}$) of 15 µm were mixed at a weight ratio of 70:30 to prepare Positive electrode material H.

A lithium secondary battery was manufactured in the same manner as in Example 1 except that Positive electrode material H prepared as described above was used instead of Positive electrode material A.

Comparative Example 4

LiNi$_{0.8}$Co$_{0.1}$Mn$_{0.1}$O$_2$ having an average particle diameter (D$_{50}$) of 5 µm and LiNi$_{0.83}$Co$_{0.11}$Mn$_{0.04}$Al$_{0.02}$O$_2$ having an average particle diameter (D$_{50}$) of 5 µm were mixed at a weight ratio of 30:70 to prepare Positive electrode material I.

A lithium secondary battery was manufactured in the same manner as in Example 1 except that Positive electrode material I prepared as described above was used instead of Positive electrode material A.

Comparative Example 5

LiNi$_{0.6}$Co$_{0.2}$Mn$_{0.2}$O$_2$ having an average particle diameter (D$_{50}$) of 5 µm and LiNi$_{0.83}$Co$_{0.11}$Mn$_{0.04}$Al$_{0.02}$O$_2$ having an average particle diameter (D$_{50}$) of 15 µm were mixed at a weight ratio of 30:70 to prepare Positive electrode material J.

A lithium secondary battery was manufactured in the same manner as in Example 1 except that Positive electrode material J prepared as described above was used instead of Positive electrode material A.

Comparative Example 6

LiNi$_{0.8}$Co$_{0.1}$Mn$_{0.1}$O$_2$ having an average particle diameter (D$_{50}$) of 5 µm and LiNi$_{0.6}$Co$_{0.2}$Mn$_{0.2}$O$_2$ having an average particle diameter (D$_{50}$) of 15 µm were mixed at a weight ratio of 30:70 to prepare Positive electrode material K.

A lithium secondary battery was manufactured in the same manner as in Example 1 except that Positive electrode material K prepared as described above was used instead of Positive electrode material A.

Experimental Example 1

The lithium secondary battery manufactured in each of Examples 1-5 and Comparative Examples 1-6 was charged/discharged at 45° C. in the range of 2.5 V to 4.2 V under the condition of 0.3 C/0.3 C to measure capacity retention rate (%) and resistance increase rate (%) at the 100th cycle and the 200th cycle. The measurement results are shown in Table 1. In addition, the FIGURE illustrates a graph showing cycle properties of the lithium secondary battery manufactured in each of Examples 1 and 2 and Comparative Example 1.

TABLE 1

|  | 100 Cycle | | 200 Cycle | |
| --- | --- | --- | --- | --- |
|  | Capacity retention rate (%) | Resistance increase rate (%) | Capacity retention rate (%) | Resistance increase rate (%) |
| Example 1 | 92.5 | 9.6 | 88.5 | 18.8 |
| Example 2 | 92.4 | 14.0 | 88.6 | 23.7 |
| Example 3 | 90.8 | 19.8 | 85.9 | 30.5 |
| Example 4 | 91.2 | 16.9 | 86.4 | 27.4 |
| Example 5 | 90.3 | 21.4 | 85.2 | 34.2 |
| Comparative Example 1 | 90.4 | 23.2 | 84.8 | 37.4 |
| Comparative Example 2 | 87.1 | 29.2 | 80.0 | 44.3 |
| Comparative Example 3 | 86.9 | 29.8 | 79.4 | 44.9 |
| Comparative Example 4 | 85.4 | 30.7 | 78.7 | 46.1 |
| Comparative Example 5 | 88.1 | 27.7 | 82.2 | 39.7 |
| Comparative Example 6 | 88.2 | 27.3 | 82.4 | 40.8 |

As shown in Table 1 and the FIGURE, the secondary batteries of Examples 1-5 using a positive electrode material which includes two kinds of positive electrode active materials satisfying the composition of the present invention and has a bimodal distribution with the difference in average particle diameter (D$_{50}$) between large diameter particles and small diameter particles of 3 µm or greater have more excellent high-temperature cycle properties than the secondary batteries of Comparative Examples 1-6. In particular, it can be seen that as the number of cycles increases, the difference in capacity properties and resistance increase rate becomes greater.

The invention claimed is:

1. A positive electrode material comprising a first positive electrode active material represented by Formula 1 below, and a second positive electrode active material represented by Formula 2 below, wherein
   the positive electrode material has a bimodal particle size distribution including large diameter particles and small diameter particles, and
   a difference an average particle diameter (D$_{50}$) between the large diameter particles and the small diameter particles is 3 µm or greater:

$$Li_a[Ni_bCo_cM^1_dM^a_e]O_2 \quad \text{[Formula 1]}$$

wherein, in Formula 1, M$^1$ is Mn, Al, Zr, or Mg, and M$^a$ is one or more elements selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, and 0.9≤a≤1.2, 0.8≤b<1, 0.01≤c<0.2, 0.01≤d<0.2, and 0≤e≤0.02.

$$Li_x[Ni_yCo_zMn_wM^2_vM^b_u]O_2 \quad \text{[Formula 2]}$$

wherein, in Formula 2, M$^2$ is Al, and M$^b$ is one or more elements selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, and 0.9≤x≤1.2, 0.8≤y<1, 0.01≤z<0.2, 0.01≤w<0.2, 0.01≤v<0.2, and 0≤u≤0.02,
   wherein the first positive electrode active material is the large diameter particles, and the second positive electrode active material is the small diameter particles.

2. The positive electrode material of claim 1, wherein an average particle diameter (D$_{50}$) of the large diameter particles is 10 µm to 20 µm.

3. The positive electrode material of claim 1, wherein an average particle diameter ($D_{50}$) of the small diameter particles is 1 μm to 7 μm.

4. The positive electrode material of claim 1, wherein the first positive electrode active material and the second positive electrode active material are present at a weight ratio of 10:90 to 90:10.

5. The positive electrode material of claim 1, wherein at least one of the first positive electrode active material or the second positive electrode active material comprises a coating layer including at least one coating element selected from the group consisting of one or more elements selected from the group consisting of Al, Ti, W, B, F, P, Mg, Ni, Co, Fe, Cr, V, Cu, Ca, Zn, Zr, Nb, Mo, Sr, Sb, Bi, Si, and S.

6. The positive electrode material of claim 1, wherein the difference in average particle diameter ($D_{50}$) between the large diameter particles and the small diameter particles is 3 μm to 15 μm.

7. A positive electrode comprising a positive electrode current collector, and a positive electrode active material layer formed on the positive electrode current collector, wherein the positive electrode active material layer comprises the positive electrode material of claim 1.

8. A lithium secondary battery comprising:
the positive electrode of claim 7;
a negative electrode;
a separator interposed between the positive electrode and the negative electrode; and
an electrolyte.

9. The positive electrode material of claim 1, wherein the difference in average particle diameter ($D_{50}$) between the large diameter particles and the small diameter particles is 3 μm to 10 μm.

10. The positive electrode material of claim 5, wherein the coating element is included in the coating layer in a content of 100 ppm to 10,000 ppm based on a total weight of the positive electrode material.

11. The positive electrode material of claim 8, wherein the coating layer is formed on an entire surface of the at least one of the first positive electrode active material or the second positive electrode active material.

12. The positive electrode material of claim 8, wherein the c oating layer is formed in an area of 5% to less than 100% of a total surface area of the positive electrode material.

13. A positive electrode material comprising a first positive electrode active material represented by Formula 1 below, and a second positive electrode active material represented by Formula 2 below, wherein
the positive electrode material has a bimodal particle size distribution including large diameter particles and small diameter particles, and
a difference in average particle diameter ($D_{50}$) between the large diameter particles and the small diameter particles is 3 μm to 15 μm:

$$Li_a[Ni_bCo_cM^1_dM^a_e]O_2 \quad \text{[Formula 1]}$$

wherein, in Formula 1, $M^1$ is Mn, and Ma is one or more elements selected from the group consisting of W, Cu, Fe, V, Cr, Ti, Zr, Zn, In, Ta, Y, La, Sr, Ga, Sc, Gd, Sm, Ca, Ce, Nb, Mg, B, and Mo, and $0.9 \leq a \leq 1.2$, $0.8 \leq b < 1$, $0.01 \leq c < 0.2$, $0.01 \leq d < 0.2$, and $0 \leq e \leq 0.02$.

$$Li_x[Ni_yCo_zMn_wM^2_vM^b_u]O_2 \quad \text{[Formula 2]}$$

wherein, in Formula 2, $M^2$ is Al, and $M^b$ is one or more elements selected from the group consisting of W, Cu, Fe, V, Cr, Ti, Zr, Zn, In, Ta, Y, La, Sr, Ga, Sc, Gd, Sm, Ca, Ce, Nb, Mg, B, and Mo, and $0.9 \leq x \leq 1.2$, $0.8 \leq y < 1$, $0.01 \leq z < 0.2$, $0.01 \leq w < 0.2$, $0.01 \leq v < 0.2$, and $0 \leq u < 0.02$,
wherein the first positive electrode active material is the large diameter particles, and the second positive electrode active material is the small diameter particles,
wherein an average particle diameter ($D_{50}$) of the large diameter particles is 10 μm to 20 μm, and an average particle diameter ($D_{50}$) of the small diameter particles is 1 μm to 7 μm.

* * * * *